United States Patent
Campbell et al.

(10) Patent No.: US 8,212,510 B2
(45) Date of Patent: Jul. 3, 2012

(54) FIBER OPTICALLY COMMUNICATED MOTOR TEMPERATURE AND POSITION SIGNALS

(75) Inventors: Jeremy B. Campbell, Torrance, CA (US); Jim R. Switzer, Placentia, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 12/614,807

(22) Filed: Nov. 9, 2009

(65) Prior Publication Data

US 2011/0109256 A1    May 12, 2011

(51) Int. Cl.
*H02K 29/12* (2006.01)
*H02K 11/00* (2006.01)
*G05B 11/01* (2006.01)
*G05B 19/10* (2006.01)
*H02P 25/00* (2006.01)
*B60W 20/00* (2006.01)

(52) U.S. Cl. .................. 318/400.37; 318/560; 318/567; 318/701; 318/787; 318/788; 318/798; 310/68 B; 310/71; 180/65.285

(58) Field of Classification Search ............. 318/400.37, 318/560, 567, 701, 787, 788, 798; 310/68 B, 310/71; 180/65.285

See application file for complete search history.

(56) References Cited

U.S. PATENT DOCUMENTS

| | | | |
|---|---|---|---|
| 6,885,920 B2 * | 4/2005 | Yakes et al. | 701/22 |
| 6,982,537 B2 * | 1/2006 | Islam et al. | 318/701 |
| 7,854,282 B2 * | 12/2010 | Lee et al. | 180/65.24 |
| 2003/0076065 A1 * | 4/2003 | Shafer et al. | 318/567 |
| 2003/0158638 A1 * | 8/2003 | Yakes et al. | 701/22 |
| 2008/0100238 A1 * | 5/2008 | Shaw | 318/268 |

* cited by examiner

*Primary Examiner* — Walter Benson
*Assistant Examiner* — Gabriel Agared
(74) *Attorney, Agent, or Firm* — Ingrassia Fisher & Lorenz P.C.

(57) ABSTRACT

Methods and apparatus are provided for a controlling an electric motor that is at least partially disposed within a motor housing. The rotational speed and position of the electric motor are sensed, and a temperature of the electric motor is sensed. The sensor signals are converted to optical signals and are propagated in a fiber optic cable. The electric motor is controlled based, at least in part, on the propagated optical signals.

20 Claims, 2 Drawing Sheets

FIBER OPTICALLY COMMUNICATED MOTOR TEMPERATURE AND POSITION SIGNALS

TECHNICAL FIELD

The present invention generally relates to electric motor control, and more particularly relates to systems and methods for using optical feedback signals to control an electric motor and reduce electromagnetic interference (EMI) emissions and the associated effects.

BACKGROUND OF THE INVENTION

Vehicles that are powered by fuel cells, batteries, and hybrid systems that include electric motors are becoming increasingly common in the automotive market. The electric motors are typically controlled using various motor control schemes. One particular type of motor control scheme that is used relies on position and speed feedback, and in some instances temperature feedback, from suitable feedback sensors in the motor to control power electronic devices. The power electronic devices, such as integrated gate bipolar transistors (IGBTs), controllably synthesize a direct current (DC) voltage into an alternating (AC) voltage that is supplied to the electric motor.

An undesirable byproduct of the above-described control scheme action is the potential for generating significant amounts of electromagnetic interference (EMI). This is due, at least in part, to the relatively rapid on-off operations implemented by the power electronics. The cables associated with the feedback sensors, because of their locations within the electric motor, can also be a significant source of EMI. Unfortunately, shielding these cables can exacerbate EMI propagation and/or reduce the shielding effectiveness of the motor cables. Although strategically placed filtering devices, such as inductors, capacitors, and shielded components, can reduce EMI, these components can increase overall system weight, cost, and size.

Accordingly, it is desirable to provide a system and method of reducing EMI emissions in an electric motor control system that does not significantly increase overall system weight, cost, and size. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A motor control system includes a motor housing, an electric motor, a rotational sensor, a temperature sensor, an electrical-to-optical (E/O) converter circuit, and a fiber optic cable. The electric motor is at least partially disposed within the motor housing, is configured to be selectively energized, and is responsive, upon being selectively energized, to rotate. The rotational sensor is disposed within the motor housing, and is configured to sense rotational speed and position of the electric motor and to supply a rotational sensor signal representative of the sensed rotational speed and position. The temperature sensor is disposed within the motor housing, and is configured to sense a temperature of the electric motor and supply a temperature signal representative of the sensed electric motor temperature. The E/O converter circuit is disposed within the motor housing, is coupled to receive the rotational sensor signal and the temperature signal, and is configured, upon receipt thereof, to convert the rotational sensor signal and the temperature signal to an optical rotational sensor signal and an optical temperature signal, respectively. The fiber optic cable is coupled to receive and propagate the optical rotational sensor signal and the optical temperature signal.

In another embodiment, an automotive drive system includes a drive shaft and an electric drive system. The drive shaft is configured to receive a drive torque. The electric drive system is coupled to, and is configured to at least selectively supply the drive torque to, the drive shaft. The electric drive system includes a motor housing, an electric motor, a rotational sensor, a temperature sensor, an electrical-to-optical (E/O) converter circuit, and a fiber optic cable. The electric motor is at least partially disposed within the motor housing, and is configured to be selectively energized and is responsive, upon being selectively energized, to rotate and supply the drive torque. The rotational sensor is disposed within the motor housing, and is configured to sense rotational speed and position of the electric motor and supply a rotational sensor signal representative of the sensed rotational speed and position. The temperature sensor is disposed within the motor housing, and is configured to sense a temperature of the electric motor and supply a temperature signal representative of the sensed electric motor temperature. The E/O converter circuit is disposed within the motor housing, is coupled to receive the rotational sensor signal and the temperature signal, and is configured, upon receipt thereof, to convert the rotational sensor signal and the temperature signal to an optical rotational sensor signal and an optical temperature signal, respectively. The fiber optic cable is coupled to receive and propagate the optical rotational sensor signal and the optical temperature signal.

In yet another embodiment, a method of controlling an electric motor that is at least partially disposed within a motor housing includes sensing rotational speed and position of the electric motor using a rotational sensor disposed within the motor housing, and supplying a rotational sensor signal representative of the sensed rotational speed and position. A temperature of the electric motor is sensed using a temperature sensor disposed within the motor housing, and a temperature signal representative of the sensed electric motor temperature is supplied. The rotational sensor signal and the temperature signal are converted to an optical rotational sensor signal and an optical temperature signal, respectively using a converter circuit disposed within the motor housing. The optical rotational sensor signal and the optical temperature signal are propagated in a fiber optic cable. The electric motor is controlled based, at least in part, on the propagated optical rotational sensor signal and the propagated optical temperature signal.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
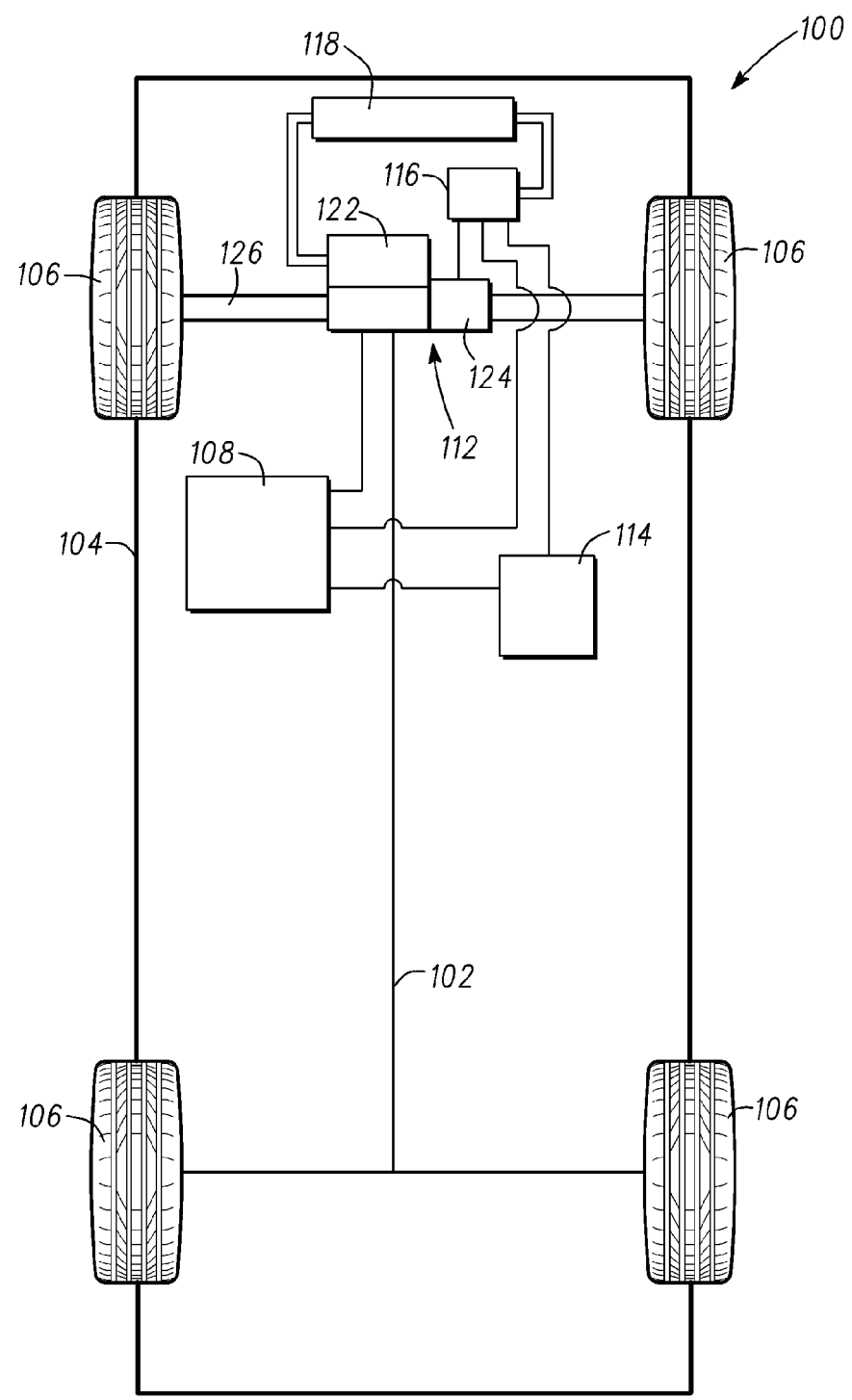
FIG. 1 is a schematic view of an exemplary automobile according to one embodiment of the present invention.

Referring now to FIG. 1, a vehicle 100, or "automobile," according to one embodiment of the present invention is depicted, and includes a chassis 102, a body 104, four wheels 106, and an electronic control system (or electronic control unit (ECU)) 108. The body 104 is arranged on the chassis 102 and substantially encloses the other components of the automobile 100. The body 104 and the chassis 102 may jointly form a frame. The wheels 106 are each rotationally coupled to the chassis 102 near a respective corner of the body 104.

The automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The automobile 100 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 100 is a hybrid vehicle, and further includes an actuator assembly (or powertrain) 112, a battery 114, a power inverter (or inverter) 116, and a radiator 118. The actuator assembly 112 includes an internal combustion engine 122 and an electric motor/generator (or motor) system (or assembly) 124. The electric motor system 124, in one embodiment, includes one or more sinusoidally-wound, three-phase alternating current (AC) motor/generators (or motors) (e.g., permanent magnet) such as commonly used in automotive vehicles (e.g., traction drive control systems, and the like). As will be appreciated by one skilled in the art, each of the electric motors includes a stator assembly (including conductive coils), a rotor assembly (including a ferromagnetic core), and a cooling fluid (i.e., coolant). The stator assembly and/or the rotor assembly within the electric motors may include multiple (e.g., sixteen) electromagnetic poles, as is commonly understood.

The combustion engine 122 and the electric motor system 124 are integrated such that both are mechanically coupled to at least some of the wheels 106 through one or more drive shafts 126. The radiator 118 is connected to the frame at an outer portion thereof and although not illustrated in detail, includes multiple cooling channels therethough that contain a cooling fluid (i.e., coolant) such as water and/or ethylene glycol (i.e., "antifreeze") and is coupled to the engine 122 and the inverter 116. In the depicted embodiment, the inverter 116 receives and shares coolant with the electric motor 124. The radiator 118 may be similarly connected to the inverter 116 and/or the electric motor 124.

The electronic control system 108 is in operable communication with the actuator assembly 112, the battery 114, and the inverter 116. Although not depicted in FIG. 1, the electronic control system 108 may include various sensors, automotive control modules, electronic control units (ECUs), and/or various other controllers, for carrying out various control processes and methods.

The automobile 100 is operated by providing power to the wheels 106 with the combustion engine 122 and the electric motor 124 in an alternating manner and/or with the combustion engine 122 and the electric motor 124 simultaneously. In order to power the electric motor 124, DC power is supplied from the battery 114 to the inverter 116, which converts the DC power into AC power. The AC power is then supplied to the electric motor 124. As will be appreciated by one skilled in the art, the inverter 116 converts the DC power to AC power by controllably operating non-illustrated power electronics devices within the inverter 116.

Figure 2:
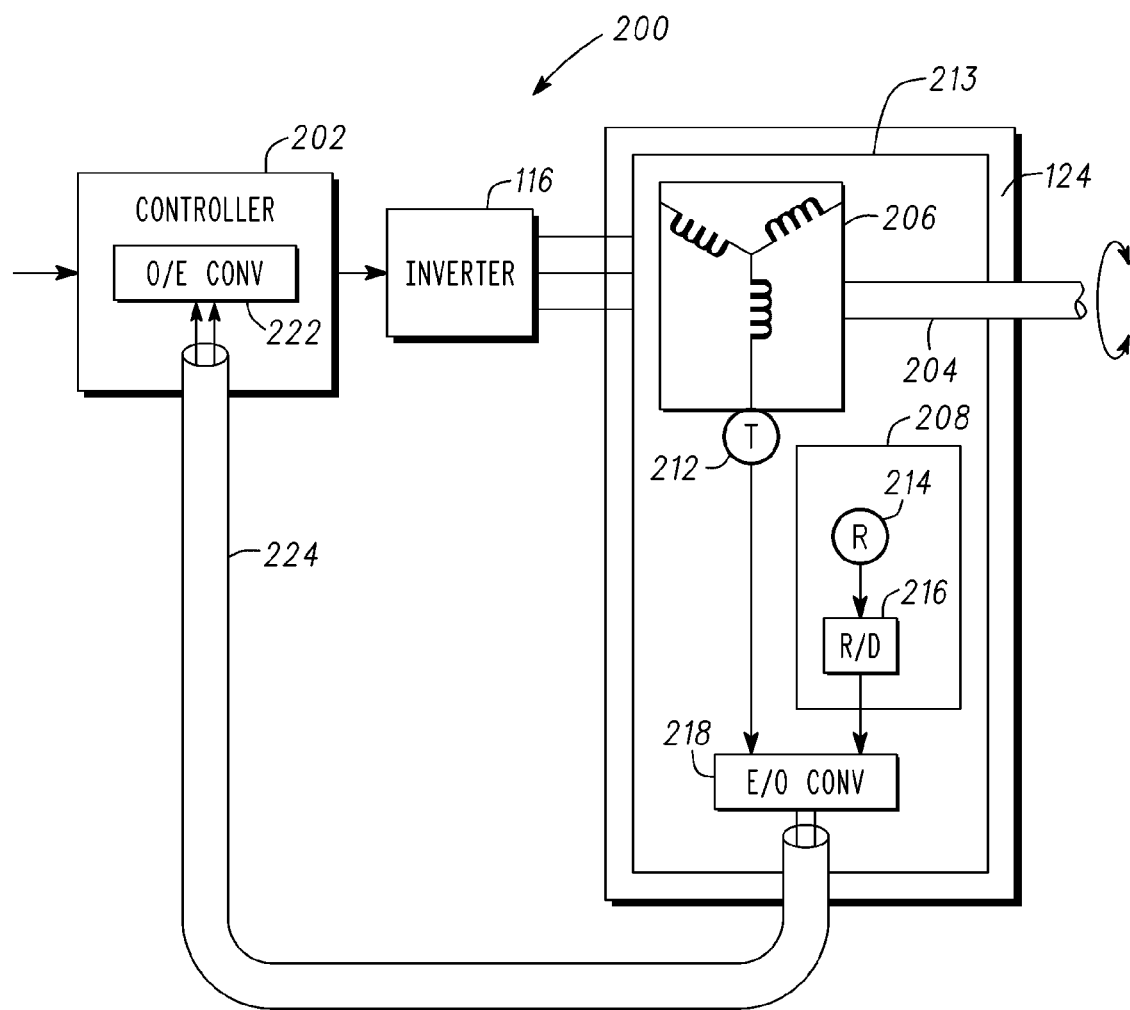
FIG. 2 is a block diagram of an electric motor control system that may be implemented within the automobile of FIG. 1.

Referring to now FIG. 2, a functional block diagram of an exemplary motor control system 200 that may be implemented in the vehicle of FIG. 1 is depicted. The system 200 includes a controller 202, the inverter 116, and the motor 124. Though not depicted in FIG. 2, it will be appreciated that the controller 202 may be integral to the electronic control system 108 shown in FIG. 1. The controller 202 is coupled to receive a command signal, such as a torque command signal, and feedback signals from a plurality of feedback sensors. As will be described momentarily, the feedback sensors include a rotational sensor 208 and a temperature sensor 212. The controller 202, in response to the command signal and the feedback signals, implements a suitable motor control scheme to generate inverter control signals. The inverter control signals are supplied to the inverter 116.

The inverter 116 is coupled to receive the inverter control signals from the controller 202. The inverter 116 is configured, in response to the inverter control signals, to convert DC electrical power to AC electrical power and supply the AC electrical power to the electric motor 124. In a preferred embodiment, it is noted that the inverter control signals generated by the controller 202 are PWM signals, which the inverter 116 converts to a modulated voltage waveform for operating the electric motor 124.

The electric motor 124 may be variously implemented, but is preferably implemented as a three-phase AC synchronous machine, such as a synchronous reluctance machine or a permanent magnet machine. The electric motor 124 is at least partially disposed within a motor housing 203, and includes a rotor 204 and a plurality of stator windings 206. The stator windings 206 are coupled to receive the AC electrical power supplied from the inverter 116 and, upon receipt thereof, induce a torque in the rotor 204.

As was noted above, the controller 202 receives feedback signals from a rotational sensor 208 and a temperature sensor 212. The rotational sensor 208 is disposed within the motor housing 203, and is configured to sense the rotational speed and position of the electric motor 124 and to supply a rotational sensor signal representative of the sensed rotational speed and position. It will be appreciated that the rotational sensor 208 may be implemented using any one of numerous suitable sensors and circuits. In the depicted embodiment, however, the rotational sensor 208 is implemented using a resolver 214 and a resolver-to-digital converter 216. The resolver-to-digital converter 216 is coupled to, and supplies electrical excitation to, the resolver 214, and also receives analog rotor position and speed signals therefrom. The resolver-to-digital converter 216 additionally converts the analog signals to a digital signal.

The temperature sensor 212 is additionally disposed within the motor housing 203, and is configured to sense a temperature of the electric motor and supply a temperature signal representative of the sensed electric motor temperature. As with the rotational sensor 208, the temperature sensor 212 may be implemented using any one of numerous suitable sensors and circuits. In the depicted embodiment, however, the temperature sensor 212 is implemented using a thermistor that is preferably embedded into at least one of the plurality of stator windings 206. In one particular implementation, a sensing resistor (not depicted) is electrically coupled in series with the thermistor 212. A known voltage is supplied to the thermistor 212 and the voltage drop across the sensing resistor is measured. Because the resistance of a thermistor 212 varies as a function of temperature, the voltage drop across the sensing resistor varies as a function of temperature.

As FIG. 2 further depicts, the motor control system 200 also includes an electrical-to-optical (E/O) converter circuit 218 and an optical-to-electrical (O/E) converter circuit 222. As is generally known, an E/O converter circuit is configured to convert electrical signals to optical signals, and an O/E converter circuit is configured to convert optical signals to electrical signals. The depicted E/O converter circuit 218 is disposed within the motor housing 203, preferably proximate the rotational sensor 208 and the temperature sensor 212, and is coupled to receive the rotational sensor signal from the rotational sensor 208 and the temperature signal from the temperature sensor 212. The E/O converter circuit 218 converts the rotational sensor signal to an optical rotational sensor signal, and converts the temperature signal to an optical temperature signal.

The optical rotational sensor signal and the optical temperature signal are supplied to the O/E converter circuit 222 via a fiber optic cable 224. More specifically, the fiber optic cable 224 is coupled to receive the optical rotational sensor signal and the optical temperature signal from the E/O converter 218 and propagates these optical signals to O/E converter circuit 222. The O/E converter circuit 222, which is preferably disposed within the controller 202, converts the optical rotational sensor signal and the optical temperature signal back to electrical signals for use by the controller 202.

The rotational sensor circuit 208, the temperature sensor 212 (at least in some embodiments), and/or the E/O converter circuit 218 are electrical devices that rely on electrical power to function. The electrical power supplied to one or more of these devices may come from one or more non-illustrated power sources. Alternatively, one or more of these devices may be electrically coupled to receive electrical power from one or more terminals of the electric motor 124. This latter configuration provides for a somewhat autonomous operation of these devices.

With the configuration described herein EMI traversal along the sensor cables is precluded, or at least substantially precluded. Moreover, the possibility for postulated mechanical failures that are associated with multiple wires and connections are significantly reduced, and the optical signals are less susceptible to noise, thereby improving signal reliability.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A motor control system, comprising:
a motor housing;
an electric motor at least partially disposed within the motor housing, the electric motor configured to be selectively energized and responsive, upon being selectively energized, to rotate;
a rotational sensor disposed within the motor housing, the rotational sensor configured to sense rotational speed and position of the electric motor and supply a rotational sensor signal representative of the sensed rotational speed and position;
a temperature sensor disposed within the motor housing, the temperature sensor configured to sense a temperature of the electric motor and supply a temperature signal representative of the sensed electric motor temperature;
an electrical-to-optical (E/O) converter circuit disposed within the motor housing, the E/O converter circuit coupled to receive the rotational sensor signal and the temperature signal, the E/O converter configured, upon receipt thereof, to convert the rotational sensor signal and the temperature signal to an optical rotational sensor signal and an optical temperature signal, respectively; and
a fiber optic cable coupled to receive and propagate the optical rotational sensor signal and the optical temperature signal.

2. The system of claim 1, further comprising:
a motor control coupled to the fiber optic cable to receive the optical rotational sensor signal and the optical temperature signal therefrom.

3. The system of claim 2, wherein the motor control comprises:
a controller coupled to receive the optical rotational sensor signal and the optical temperature signal and configured, at least in partial response thereto, to generate inverter control signals; and
an inverter coupled to the electric motor and to receive the inverter control signals and configured, in response to the inverter control signals, to convert DC electrical power to alternating current (AC) electrical power and supply the AC electrical power to the electric motor.

4. The system of claim 3, further comprising a direct current (DC) electrical power source coupled to the inverter for supplying the DC electrical power thereto.

5. The system of claim 1, wherein the rotational sensor comprises:
a resolver configured to sense rotational speed and position of the electric motor and supply analog speed and position signals representative thereof; and
a resolver-to-digital converter circuit coupled to receive the analog speed and position signals from the resolver and supply convert these analog signals to a digital resolver signal representative of motor position and speed, the rotational sensor signal comprising the digital resolver signal.

6. The system of claim 1, wherein the temperature sensor comprises a thermistor.

7. The system of claim 6, wherein:
the electric motor comprises a rotor and a plurality of stator windings; and
the thermistor is at least partially embedded into at least one of the stator windings.

8. The system of claim 1, further comprising an electrical power source coupled to and configured to supply electrical power to the electric motor.

9. The system of claim 8, wherein the electrical power source is further coupled and configured to supply electrical power to one or more of the (i) rotational sensor, (ii) the temperature sensor, and (iii) the E/O converter circuit.

10. An automotive drive system, comprising:
a drive shaft configured to receive a drive torque; and
an electric drive system coupled to, and configured to at least selectively supply the drive torque to, the drive shaft, the electric drive system comprising:
a motor housing;
an electric motor at least partially disposed within the motor housing, the electric motor configured to be selectively energized and responsive, upon being selectively energized, to rotate and supply the drive torque;

a rotational sensor disposed within the motor housing, the rotational sensor configured to sense rotational speed and position of the electric motor and supply a rotational sensor signal representative of the sensed rotational speed and position;

a temperature sensor disposed within the motor housing, the temperature sensor configured to sense a temperature of the electric motor and supply a temperature signal representative of the sensed electric motor temperature;

an electrical-to-optical (E/O) converter circuit disposed within the motor housing, the E/O converter circuit coupled to receive the rotational sensor signal and the temperature signal, the E/O converter configured, upon receipt thereof, to convert the rotational sensor signal and the temperature signal to an optical rotational sensor signal and an optical temperature signal, respectively; and a fiber optic cable coupled to receive and propagate the optical rotational sensor signal and the optical temperature signal.

11. The system of claim 10, further comprising:
a motor control coupled to the fiber optic cable to receive the optical rotational sensor signal and the optical temperature signal therefrom.

12. The system of claim 11, wherein the motor control comprises:
a controller coupled to receive the optical rotational sensor signal and the optical temperature signal and configured, at least in partial response thereto, to generate inverter control signals; and
an inverter coupled to the electric motor and to receive the inverter control signals and configured, in response to the inverter control signals, to convert DC electrical power to alternating current (AC) electrical power and supply the AC electrical power to the electric motor.

13. The system of claim 12, further comprising a direct current (DC) electrical power source coupled to the inverter for supplying the DC electrical power thereto.

14. The system of claim 10, wherein the rotational sensor comprises:
a resolver configured to sense rotational speed and position of the electric motor and supply analog speed and position signals representative thereof; and
a resolver-to-digital converter circuit coupled to receive the analog speed and position signals from the resolver and supply convert these analog signals to a digital resolver signal representative of motor position and speed, the rotational sensor signal comprising the digital resolver signal.

15. The system of claim 10, wherein the temperature sensor comprises a thermistor.

16. The system of claim 15, wherein:
the electric motor comprises a rotor and a plurality of stator windings; and
the thermistor is at least partially embedded into at least one of the stator windings.

17. The system of claim 10, further comprising an electrical power source coupled to and configured to supply electrical power to the electric motor.

18. The system of claim 17, wherein the electrical power source is further coupled and configured to supply electrical power to (i) rotational sensor, (ii) the temperature sensor, and (iii) the E/O converter circuit.

19. A method of controlling an electric motor that is at least partially disposed within a motor housing, the method comprising the steps of:
sensing rotational speed and position of the electric motor using a rotational sensor disposed within the motor housing;
supplying a rotational sensor signal representative of the sensed rotational speed and position;
sensing a temperature of the electric motor using a temperature sensor disposed within the motor housing;
supplying a temperature signal representative of the sensed electric motor temperature;
converting the rotational sensor signal and the temperature signal to an optical rotational sensor signal and an optical temperature signal, respectively using a converter circuit disposed within the motor housing;
propagating the optical rotational sensor signal and the optical temperature signal in a fiber optic cable; and
controlling the electric motor based, at least in part, on the propagated optical rotational sensor signal and the propagated optical temperature signal.

20. The method of claim 19, further comprising:
energizing the motor, the rotational sensor, the temperature sensor, and the converter circuit from the same power source.

* * * * *